(No Model.)

W. H. ORR.
WALL OF BUILDINGS AND OTHER STRUCTURES.

No. 312,375. Patented Feb. 17, 1885.

WITNESSES:
Theo. G. Hoster
C. Sedgwick

INVENTOR:
W. H. Orr
BY Munn & Co
ATTORNEYS.

UNITED STATES PATENT OFFICE.

WILLIAM H. ORR, OF CARLISLE, INDIANA, ASSIGNOR TO HIMSELF AND JOHN ROTRAMEL, OF SAME PLACE.

WALL OF BUILDINGS AND OTHER STRUCTURES.

SPECIFICATION forming part of Letters Patent No. 312,375, dated February 17, 1885.

Application filed September 4, 1884. (No model.)

*To all whom it may concern:*

Be it known that I, WILLIAM H. ORR, of Carlisle, in the county of Sullivan and State of Indiana, have invented certain new and useful Improvements in the Walls of Buildings and other Structures, of which the following is a full, clear, and exact description.

This invention consists in a method of constructing walls, fences, and other structures, including cellars, dwelling-houses, stores, warehouses, ice-houses, &c., by building up the same in or with bales composed of hay, straw, or other loose fibrous balable material and holding and compacting the bales together when in place by tightening bolts and plates, to give them a sufficient firmness or hardness to admit of their being faced both inside and outside, if desired, with cement or plaster of other materials.

Reference is to be had to the accompanying drawings, forming a part of this specification, in which similar letters of reference indicate corresponding parts in both the figures.

Figure 1:
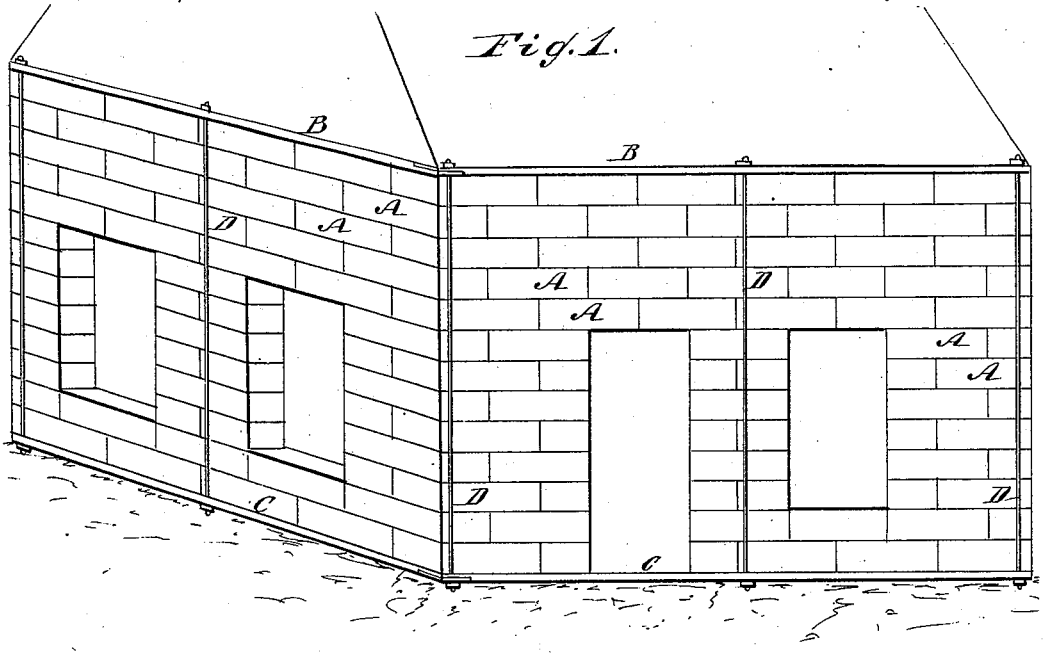
Figure 2:
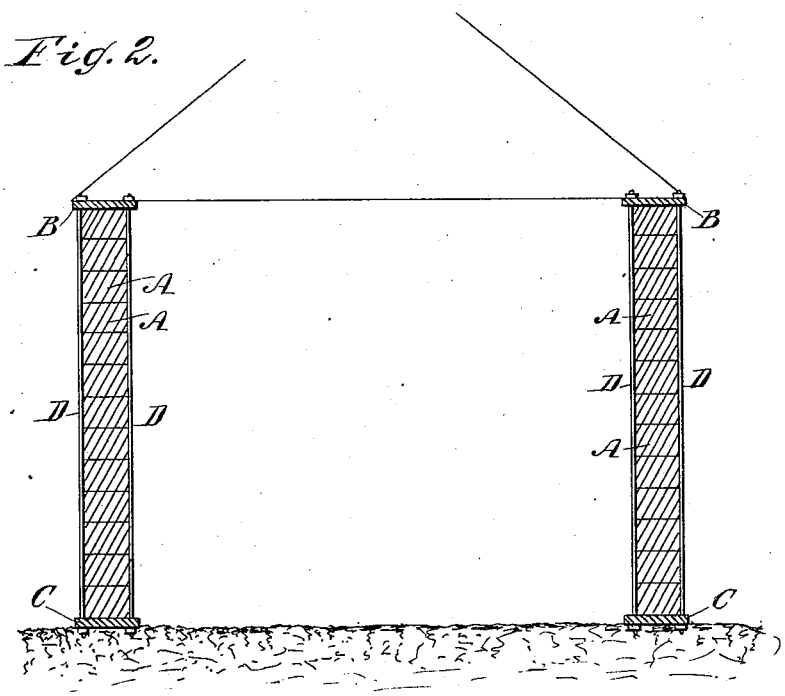

Figure 1 represents a view in perspective of two sides or side and end of a building in part embodying my invention, and Fig. 2 a vertical end section of the same.

A A indicate a series of bales mounted one upon the other, and of which the walls of the building are built, said bales being composed of hay, straw, or other fibrous material capable of being pressed into bales. Upon the top of each of said walls is arranged a plate, B, and under it a sill, C; or there may be any number of such plates and sills, according to the length of the wall. These plates and sills are connected by outer and inner metal screw-bolts, D, which, on being tightened up, serve to hold the bales together and to compress and compact them, sufficiently so, at least, to admit of their being faced, if desired, both inside and outside, with cement or plaster or other materials.

When the structure is not a mere fence or blank wall, but requires to have openings in in it for doors or windows, the ends or marginal portions of the bales at such openings may, if desired, have blocks of wood secured to them by baling-wire, to provide for nailing or screwing the frames of the doors, windows, or corner-strips to them. The bales of which the wall or structure is composed it is preferred to arrange so that they will break joint one with the other, as shown in Fig. 1.

The bolts used to bind or hold the bales together may either be arranged on the exterior or interior surfaces, or be passed through the body portions of the bales, as desired.

The bales, if desired, may be split from end to end to form partitions in buildings, walls, or fences, and for other purposes. Furthermore, it is proposed to trim the opposite sides of the bales, so as to remove the spongy or loose fiber from their outside and inside finish or face to the walls, &c.

Having thus described my invention, I claim as new and desire to secure by Letters Patent—

In a wall, fence, or other like structure, the combination of the bales A A, of hay, straw, or other fibrous balable material, arranged to break joint with one another, the plates and sills B C, and the inside and outside screw or tightening bolts, D, essentially as shown and described.

WILLIAM H. ORR.

Witnesses:
 A. J. LATSHAW,
 GEO. WHIPPS.